Dec. 17, 1940.     O. ROELEN     2,225,487
PRODUCTION OF PARAFFIN
Filed July 3, 1937
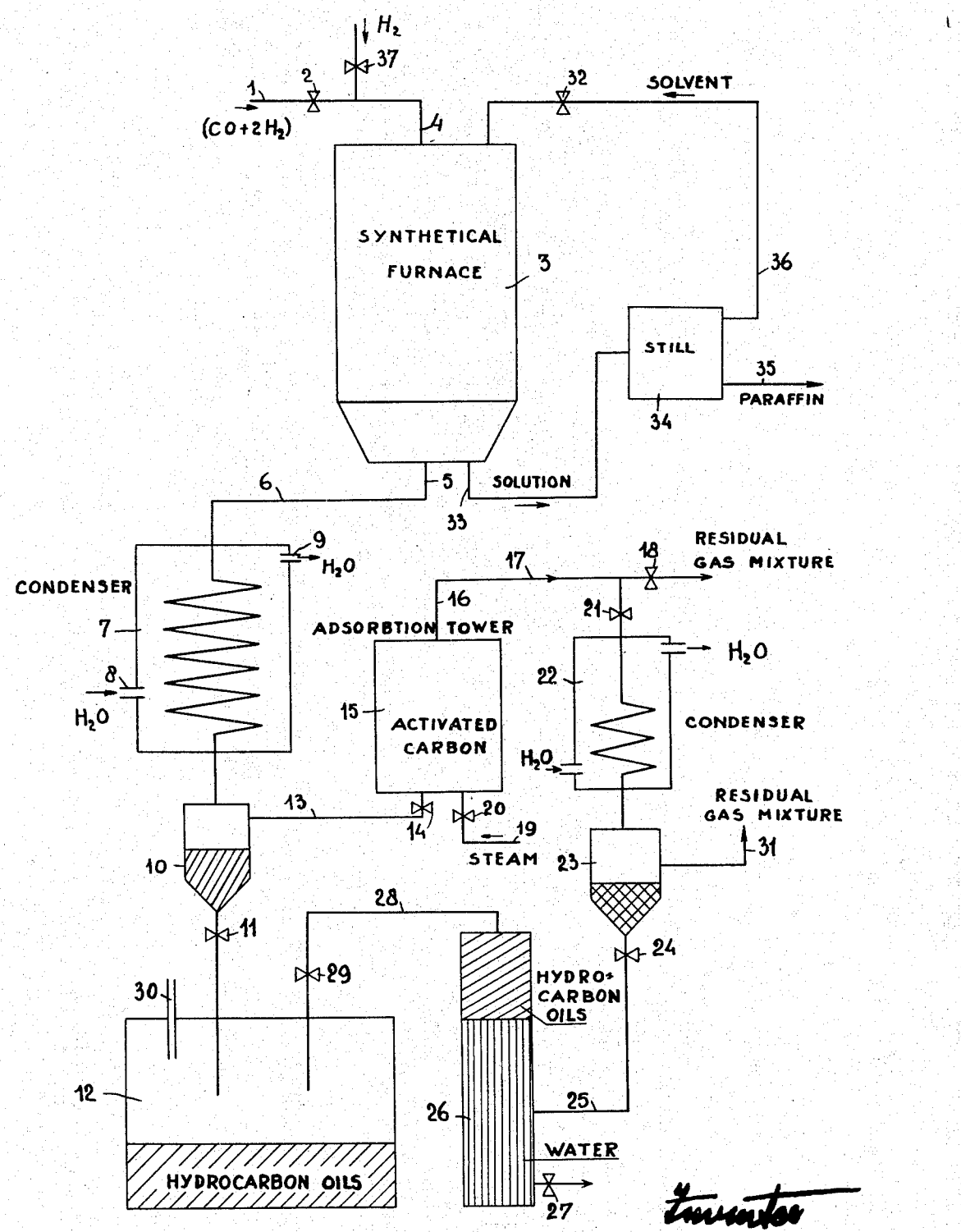

Patented Dec. 17, 1940

2,225,487

UNITED STATES PATENT OFFICE 2,225,487

PRODUCTION OF PARAFFIN

Otto Roelen, Oberhausen-Holten, Germany, assignor, by mesne assignments, to Hydrocarbon Synthesis Corporation, Linden, N. J.

Application July 3, 1937, Serial No. 151,835
In Germany July 3, 1936

5 Claims. (Cl. 260—449)

My invention relates to the production of hydrocarbons, and more especially paraffin, by hydrogenating oxides of carbon with hydrogen or with gas mixtures containing hydrogen in the presence of a catalyst.

When converting carbon monoxide in the presence of a catalyst into higher hydrocarbons by interaction with hydrogen according to the method of Franz Fischer and Hans Tropsch as disclosed in U. S. Letters Patent No. 1,746,464, and in Berichte (1927), vol. 60B, pages 1330 to 1334, it has been found that after a comparatively short time the efficiency of the catalyst drops. It has hitherto been tried to compensate the reduction of yield resulting therefrom by raising the temperature. However such rise of temperature is only possible within narrow limits and consequently the regeneration will last only for a short period of time. To raise the temperature still higher becomes impossible in view of the large quantities of methane, which are then formed. Thus the spent catalyst must be replaced after a comparatively short time by fresh catalyst masses and cannot be simply regenerated.

It has already been proposed to carry out the catalytic hydrogenation at lower temperatures, since it is known that in the synthetical production of hydrocarbons the active life of a catalyst will be the longer, the lower the temperature of reaction. Even in these cases the active life of the catalysts does however not last longer than one to two months and even within such periods of time the maximum yields cannot be obtained permanently, while after the lapse of one to two months the catalyst must be regenerated outside of the reaction chamber. It appeared impossible to permanently obtain the desired yield at low temperatures of reaction.

In the copending application for Letters Patent of the United States Serial No. 114,186, filed by me jointly with Walter Feisst and Hans Neweling on December 4, 1936, for "Conversion of carbon oxides into higher hydrocarbons," it has been disclosed that it is possible to greatly lengthen the life of the catalysts by removing in short intervals from the catalysts those substances, such as for instance high melting paraffins, which have settled on the catalyst in the course of the hydrogenation reaction and paralyse its action. According to this prior invention this removal shall take place before the substances appreciably impair the catalytic efficiency. The drop of the catalytic efficiency is caused by non-volatile products of the reaction between the hydrogen and the oxides of carbon, which reaction products are deposited on the catalyst. Before these deposits are capable of appreciably impairing the catalytic efficiency, they were removed either by treatment with hydrogen or by an extraction with a suitable solvent. These treatments may be carried out in the reaction chamber itself at a temperature not materially above and even considerably below the reaction temperature. While it has been found that the treatment with hydrogen must be carried through about every 24 hours in order to restore the original catalytic efficiency, extraction with the solvent need only be carried through about every four days.

Further investigation has now shown that even in these short intervals of about four days, within which the efficiency of the catalyst does not drop appreciably, so that it may be restored in accordance with the prior invention, this efficiency nevertheless does not remain constant, but will change with respect to the kind of the products obtained in the catalytic hydrogenation. I have found that the yield in paraffin drops within these periods. I have further found that the yield in paraffin may be materially increased by treating the catalyst with the extracting solvents at a much earlier stage than required in order to lengthen the active life of the catalyst. I remove the non-volatile reaction products deposited on the catalyst, which contain the paraffin desired, not only at a time when the yield in benzine and oils has considerably dropped, but as soon, and as often, as the paraffin formed is appreciably diminished in comparison with the quantities of the other products simultaneously formed.

I proceed, on principle, in exactly the same manner as described in the copending application Ser. No. 114,186, however with the difference that the regeneration of the catalyst by treating it with solvents or mixtures of solvents is carried out considerably more often, for instance twice or three times as often as suggested in the copending application. I use the same starting gas mixtures, the same reaction conditions and the same catalysts as mentioned in the copending application, i. e. any catlyst known to favor the conversion of hydrogen and a carbon oxide into paraffin, such as iron, nickel or cobalt catalysts which may contain activating additions, for instance an alkalis or alkaline earth, magnesium, a rare earth metal, thorium, copper or manganese and which may be spread on carriers such as kieselguhr.

In order to obtain a good yield in paraffin I contact the reactants with the catalyst for a period of about 12 to 36 hours. The pressure may range between atmospheric pressure and 50 atmospheres. In this manner I succeed in obtaining paraffin in an amount of up to 40 per cent, calculated on the liquid and solid products formed in the hydrogenation of the carbon oxide treated. As secondary products are formed in the hydrogenation methane, carbon dioxide and a small quantity of up to 1 per cent oxygen derivatives such as aldehydes, ketones, acids and alcohols. The following kinds of paraffin are formed in my process:

(a) Soft paraffin with a melting point of about 40° C., (b) Cake paraffin with a melting point of for instance 50 to 54° C., (c) Hard paraffin with a melting point of for instance 80 to 85° C. or 100 to 110° C.

In practicing my invention I may for instance proceed as follows:

In order to convert a material proporton of the carbon monoxide into high melting paraffin, a gas mixture consisting of 28 to 29% carbon monoxide, 56 to 60% hydrogen, the remainder being carbon dioxide and nitrogen, is passed at a temperature of about 250° C. in contact with an alkalinised iron catalyst obtained by heating ferric nitrate to convert it into ferric oxide which is then treated with 1 to 2 per cent potassium carbonate, whereupon the mixture is reduced with hydrogen. The contact substance thus obtained consists of about 98% metallic iron and about 2% potassium carbonate.

In intervals of one to two days the temperature of the catalyst is lowered to about 110° C. and the high melting paraffin is extracted from the catalyst within the synthetical furnace with the aid of a benzine fraction boiling between 130 and 140° C. After the extraction has come to an end, hydrogen may be passed through the catalyst, the temperature being at the same time raised to about 250° C. Shortly after this temperature has been reached, the starting gas mixture is again passed in contact with the catalyst and the synthetical process continued during about one to two days, before another regeneration operation is gone through. The extracted solution is subjected to distillation to separate the solvent from the high melting paraffin.

One mode of operating the process according to my invention may be described more in detail with reference to the flow sheet here annexed.

Through a pipe 1 and valve 2 a mixture of carbon monoxide and hydrogen is introduced into the synthetical furnaces 3 at 4. The gases formed in the reaction escape from the furnace at 5 and flow through the pipe 6 into the condenser 7 supplied at 8 with cooling water, which escapes at 9. In this condenser part of the condensable products is separated out and these products collect in the vessel 10, from which they may flow through valve 11 into a reservoir 12. The non-condensable gases and vapors escape from the container 10 through pipe 13 and valve 14 into an adsorption tower 15 filled with activated carbon, escaping at 16 through the pipe 17 and valve 18. When the active carbon in the tower 15 is spent, the gases escaping from the vessel 10 are passed through another adsorption tower (not shown). In order to expel the hydrocarbons, steam is passed through pipe 19 and valve 20 into the carbon tower 15; while this expulsion takes place, the valves 14 and 18 are closed, the valves 20 and 21 open. The gases and vapors escaping from the tower 15 flow through pipe 17 and valve 21 into a condenser 22. The condensable products collect in the settling tank 23 and are passed through a pipe 25 and valve 24 to a separator 26, in which the condensation products are separated into a water layer and a supernatant oil layer. The non-condensable gases escape from the separator 23 through the pipe 31. The water is tapped from the separator 26 through valve 27, while the condensed hydrocarbons are fed through an overflow tube 28 and valve 29 to the receiver 12, which is provided with a pressure compensation tube.

When the synthetical process has been carried through 24 to 48 hours, the valve 2 is closed and a solvent for the paraffin formed in the process is introduced into the furnace 3 at 32. The solution of paraffin is withdrawn at 33 and led to the still 34, in which the solvent is separated from the paraffin by distillation. The solvent recovered is withdrawn at 36 and may be introduced afresh into the synthetical furnace. The paraffin is withdrawn from the still 34 at 35. After the extraction of the catalyst present in the synthetical furnace has come to an end, the valve 32 is closed and hydrogen gas is passed for a short time through the valve 37 into the furnace 3, whereupon the starting gas mixture is again passed in to contact with the catalyst and the synthetical process continued anew during 24 to 48 hours, before another extraction is carried out.

I have further found that the paraffin dissolved in the liquid with which the catalyst has been extracted, may be prematurely precipitated, if benzine is used as extracting means and the room temperature is comparatively low. I may overcome this drawback by adding to the benzine, used for extraction, a certain quantity of higher boiling hydrocarbons produced in the hydrogenation itself.

In summer or with an apparatus provided with heated pipes I may employ as solvent for treating the catalyst a heavy benzine, for instance a fraction of synthetically produced hydrocarbons boiling between 190 and 220° C. The extraction with the aid of such a heavy benzine may easily be carried out within the synthetic furnace at about 180° C.

When sufficient quantities of the benzine fraction boiling between so narrow limits are not available or if the room temperature is so low that the paraffin might possibly separate out from the solution in the cooler parts of the apparatus, I prefer to use a solvent consisting of a mixture of benzine and heavier oils, for instance a mixture of hydrocarbons which starts boiling at 200° C. and ends boiling at about 300–320° C.

It is a particular advantage of my process that for the extraction of the catalyst such hydrocarbon fractions may be employed which are refused for many other purposes, for instance the heavy benzine fraction boiling about 200° C. Thus I may extract the catalyst with a mixture consisting to 50 per cent of a heavy benzine boiling between 180 and 200° C. and to 50 per cent of the higher boiling hydrocarbons with boiling limits of 200 and 320° C. With such a mixture the extraction may be easily carried out within the synthetic furnace at about 170° C., so that the temperature in the reaction zone need not be lowered, for the extraction treatment, to about 110° C., as in the above mentioned example.

Various changes may be made in the details disclosed in the foregoing specification without departing from the invention or sacrificing the advantages thereof.

I claim:

1. In the production of paraffin by acting on a carbon oxide in the presence of a catalyst which is suitable for forming hydrocarbons, with gases containing free hydrogen, which are practically free from other reactants, at an elevated temperature below that at which methane would normally be exclusively formed with the use of the same gases and the same catalyst, the step of periodically removing from the catalyst by extraction with a solvent for paraffin the non-volatile reaction products, which have settled on the catalyst, at a temperature not materially above the reaction temperature, each time before the proportion of paraffin formed is appreciably diminished in comparison with the other products simultaneously formed.

2. The process of claim 1, wherein a mixture of benzine with higher boiling hydrocarbons is used as solvent in the extraction step.

3. The process of claim 1, wherein a mixture of benzine with a higher boiling fraction of oil produced in the said catalytic hydrogenation is used as solvent in the extraction step.

4. In the production of paraffin by acting on a carbon oxide in the presence of a catalyst which is suitable for forming hydrocarbons, with gases containing free hydrogen, which are practically free from other reactants, at an elevated temperature below that at which methane would normally be exclusively formed with the use of the same gases and the same catalyst, the step of periodically removing from the catalyst, while in the reaction zone, by extraction with a solvent for paraffin the non-volatile reaction products, which have settled on the catalyst, at a temperature not materially above the reaction temperature, the earlier each time before the proportion of paraffin formed is appreciably diminished in comparison with the other products simultaneously formed the more paraffin is intended to be produced from a predetermined amount of the starting materials.

5. In the production of paraffin by acting on a carbon oxide in the presence of a catalyst which is suitable for forming hydrocarbons, with gases containing free hydrogen, which are practically free from other reactants, at an elevated temperature below that at which methane would normally be exclusively formed with the use of the same gases and the same catalyst, the step of periodically removing from the catalyst by extraction with a solvent for paraffin the non-volatile reaction products, which have settled on the catalyst, at a temperature not materially above the reaction temperature, within intervals which are at most about half as long as the periods within which said non-volatile reaction products are capable of appreciably impairing the efficiency of the catalyst employed under the operating conditions used.

OTTO ROELEN.